United States Patent [19]

Leblanc et al.

[11] 4,406,263

[45] Sep. 27, 1983

[54] FUEL INJECTION PUMP

[75] Inventors: Jean Leblanc, Lyon; Jean Pigeroulet, Villeurbanne, both of France

[73] Assignee: Robert Bosch GmbH, Stuttgart, Fed. Rep. of Germany

[21] Appl. No.: 243,101

[22] Filed: Mar. 12, 1981

[30] Foreign Application Priority Data

Mar. 21, 1980 [DE] Fed. Rep. of Germany ....... 3010839

[51] Int. Cl.³ .......................................... F02M 37/04
[52] U.S. Cl. .................................... 123/357; 123/449
[58] Field of Search .............. 123/357, 387, 449, 450, 123/499, 501, 503; 464/29

[56] References Cited

U.S. PATENT DOCUMENTS

| 4,036,193 | 7/1977 | Kobayashi et al. | 123/357 |
| 4,065,234 | 12/1977 | Yoshiyuki et al. | 464/29 |
| 4,197,058 | 4/1980 | Simko | 123/449 |
| 4,200,072 | 4/1980 | Bailey | 123/450 |

Primary Examiner—Craig R. Feinberg
Attorney, Agent, or Firm—Edwin E. Greigg

[57] ABSTRACT

A fuel injection pump is proposed which has a distributor in which both the injection quantity and the onset of injection are variable. The distributor is axially displaced via electric servomotors and is rotated relative to the drive shaft.

3 Claims, 5 Drawing Figures

FUEL INJECTION PUMP

BACKGROUND OF THE INVENTION

The invention is based on a fuel injection pump for internal combustion engines. In a known fuel injection pump of this kind (German Pat. No. 1 303 637), the distributor is actuated by a mechanical regulator in order to regulate the fuel quantity. This mechanical regulator has a spring packet whose force is arbitrarily variable and which acts counter to the force of flyweights. Not only is a mechanical regulator of this type quite expensive to produce but it is also becoming more and more difficult due to tightened emission laws to satisfy the fuel injection requirements made by engine manufacturers with such a mechanical regulator.

OBJECT AND SUMMARY OF THE INVENTION

It is the object of the invention to provide a fuel injection pump having computerized electronic control of the set-point variable in the injection system so that the injection can be readily adapted to meet the most varied requirements of quite diverse engine characteristics, while maintaining the production cost at relatively inexpensive levels.

The invention will be better understood and further objects and advantages thereof will become more apparent from the ensuing detailed description of two preferred embodiments taken in conjunction with the drawings.

DESCRIPTION OF THE PREFERRED EMBODIMENTS

Figure 1:
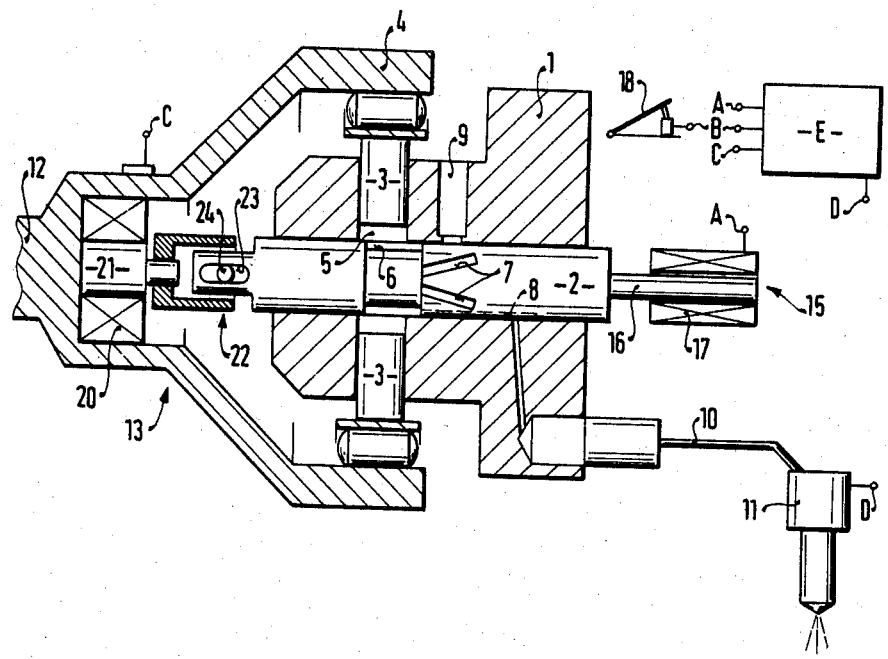
FIG. 1 is a simplified longitudinal section taken through the first exemplary embodiment, showing only those elements which relate to the invention.

Both exemplary embodiments of the invention are provided with a distributor 2 which is axially displaceable for the purpose of varying the fuel quantity. The distributor 2 is disposed so as to rotate within a housing 1 and is to provide with at least two radial pistons 3 disposed in this housing 1, which pistons are driven by a cuplike cam 4. A pump work chamber 5 is provided between the distributor 2 and each of the pump pistons 3 in constant communication with a longitudinal groove 6 disposed on the jacket face of the distributor 2. Branching off from this annular groove 6, there are provided a pair of longitudinal grooves 7, extending obliquely on the jacket face of the distributor, and a distributor groove 8. A supply bore 9 is controlled by the oblique grooves 7 and communicates with a fuel source. The distributor groove 8 leads to pressure lines 10, which in turn lead to fuel injection nozzles 11 disposed on the internal combustion engine.

Because of the oblique disposition of the grooves 7, the supply bore 9 is opened for varying time periods in accordance with the axial position of the distributor 2. As a result, either the effective duration of injection varies in length thus determining the fuel injection quantity or the supply bore 9 is allowed to remain open for differing lengths of time to provide fuel supply during the intake stroke of the pump. The distributor groove 8, in contrast, serves to supply fuel sequentially to the individual pressure lines 10 during the compression stroke of the pump pistons 3.

The cuplike cam 4 is positively connected to a drive shaft 12, which drives the distributor 2 via a coupling 13. As a result of this coupling 13, the rotary position of the distributor 2 relative to the drive shaft 12 is variable; thus the onset of injection of the injection pump is accordingly variable, because the position of the oblique grooves 7 relative to the supply bore 9 is varied as well.

In the first exemplary embodiment shown in FIG. 1, the axial actuation of the distributor 2 is shown schematically. A more specific example of a possible structure is shown in connection with the second exemplary embodiment. The distributor 2 is axially adjusted by a servomotor 15 having an electromagnet for which a tang 16 of the distributor 2 serves as the armature. The coil 17 of the magnet is connected via a terminal A on the servomotor 15 with a terminal A on an electronic control device E. The electronic control device E, which contains a program based on operating characteristics of the engine, such as rpm, load and the like, receives actual values on engine state in the form of the position of the gas pedal 18, via a connection to a terminal B. The actual values received by the control device, such as gas pedal position, the rpm, temperature and so on, are processed in the electronic control device E and fed in the form of a set-point value to the electrical converters, such as the servomotor 15.

The coupling 13 comprises in this exemplary embodiment a magnetic coupling, in which a coil 20 rotates along with the drive shaft 12 and carries with it in its rotation an armature 21, which in turn transports the distributor 2 along rotationally via a universal joint 22. The distributor 2 is provided with an oblong slot 23, which is engaged by a pin 24 of the universal joint to permit an axial movement on the part of the distributor 2, for purposes of fuel quantity variation, which is independent from the coupling 13. The magnetic coupling 13 is likewise triggered by the electronic control device E via the terminals C, so that the onset of injection is effectuated by the relative rotation of a rotary magnet or by permitting a follow-up on the part of the armature of the magnetic coupling. The actual value of the onset of injection is advantageously measured via the terminals D by a transducer located directly at the injection nozzle 11.

Figure 2:
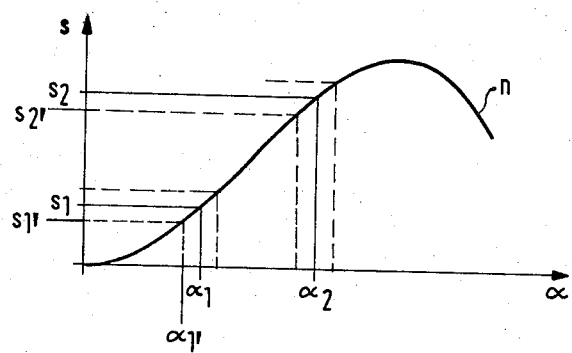
FIG. 2 is a graphic diagram explaining the function of the invention.

In order to explain the basic function of this pump, a diagram is given in FIG. 2 in which the stroke s of the pump piston (ordinate) is plotted over the rotary angle $\alpha$ of the drive shaft (abscissa). A curve n represents the course of the drive cam 4. After a pre-stroke $s_1$ has been executed, one of the oblique grooves 7 intercepts the communication of the pump work chamber 5 with the supply bore 9, so that the injection begins. After an injection stroke $s_2$ of the pump pistons 3 has been executed, the supply bore 9 is opened once again by the second oblique groove 7, as a result of which injection is interrupted. The onset of injection and the end of injection occur at the rotary angles $\alpha_1$ and $\alpha_2$, respectively. During the axial displacement of the distributor 2, the oblique position of the grooves 7 relative to the supply bore 9 is varied, so that as a result the period of time during which the supply bore 9 is blocked can be changed. The portion of the stroke of the pump piston 3 which is located between $s_1$ and $s_2$ can also be varied accordingly. Depending on the course taken by the grooves 7, there can also be a variation of the onset of injection; it may be desired, for instance, that the onset of injection occur earlier with increasing rpm. A supplementary change in the onset of injection, especially when it is intended that there be no change in fuel quantity, can be attained if the distributor 2 is rotated relative to the drive shaft 12. This relative rotation shifts the effective supply stroke action of the pump pistons 3 relating to the onset; an example would be the earlier occurrence of injection at the stroke portions $s_{1'}$ and $s_{2'}$. In other words, the injection would be allowed to begin at a rotary angle $\alpha_{1'}$. Theoretically, the supply position on the cam curve n is shifted in its entirety in one or the other direction.

Figure 3:
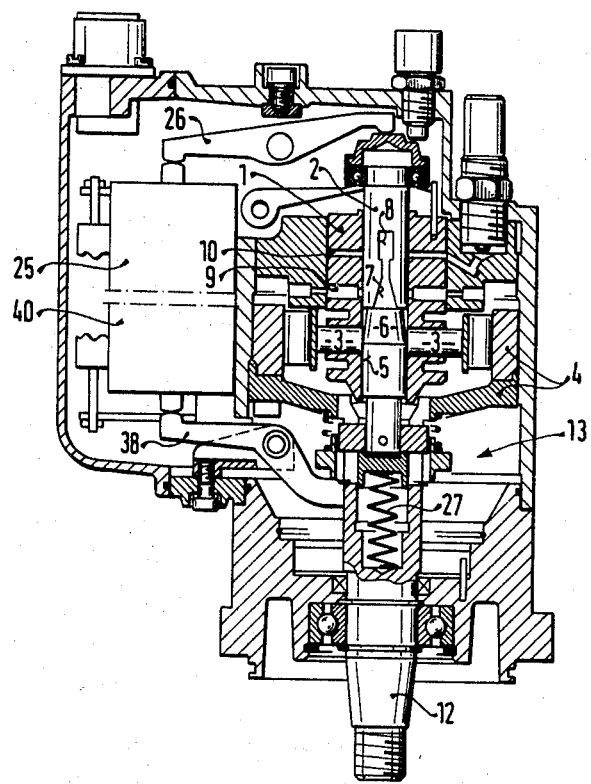
FIG. 3 is a longitudinal section through the second exemplary embodiment.
Figure 4:
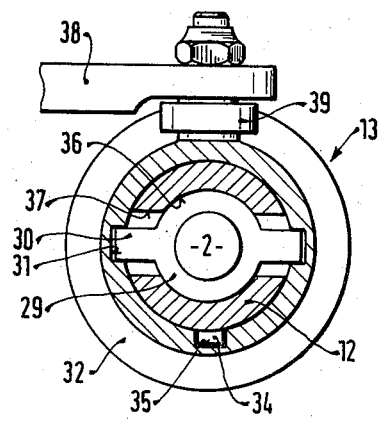
FIG. 4 is a cross section taken along the line IV—IV of FIG. 5.
Figure 5:
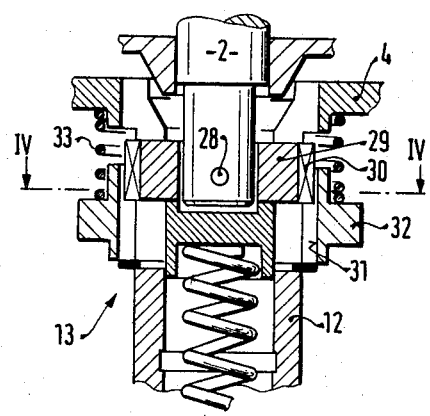
FIG. 5 is an enlarged sectional view of the coupling element according to FIG. 3.

Referring now to the second exemplary embodiment shown in FIGS. 3–5, the distributor 2 is displaced via a reciprocating magnet 25, which is disposed parallel to the distributor 2 and acts upon the distributor, via a lever 26, counter to the force of a spring 27. An oblique longitudinal groove 7 is embodied here as cone-shaped, diverging at one end to open at the bottom and converging at the other end into a narrow aperture communicating with the distributor groove 8. The pressure line bore 10 is disposed such that it is shifted axially on the circumference relative to the supply bore 9; as a result, no fuel can flow out via the bore 9 during the portion of the stroke when injection is taking place.

The coupling 13 is shown on a larger scale in FIGS. 4 and 5. Considering FIG. 5 first, the distributor 2 is connected via a pin 28 with a coupler element 29 provided with flat end sections 30 engaging longitudinal grooves 31 of a coupler ring 32. The coupler ring 32 is displaced via the drive shaft 12 and is displaceable thereon counter to the force exerted by a restoring spring 33 on the cam ring 4 which is rigidly connected to the drive shaft 12. Turning now to FIG. 4, the coupler ring 32 is carried along in rotation by the drive shaft 12 via a tang 34; to achieve this union rotationally, the drive shaft 12 engages a slightly helical longitudinal groove 35 in the inner bore of the coupler ring 32. The distributor 2 and the coupler member 29 are received in an inner bore 36 of the drive shaft 12, and the ends 30 of the coupler member 29 protrude toward the coupler ring 32 through recesses 37 in the drive shaft 12. These recesses 37 are enlarged so as to provide for a relative rotation of the drive shaft with respect to the coupler element or distributor. This relative rotation is effected by the axial displacement of the coupler ring 32, which is rotated via the helical groove 35 and the tang 34 relative to the drive shaft 12 and thus carries the distributor 2 along in rotation by means of the coupler element 29 or, more specifically, by means of the ends 30 and the longitudinal grooves 31. The coupler ring 32 itself is displaced via a lever 38, which engages the ring via a roller 39 and is engaged on the side remote from the ring by a magnet 40 disposed parallel to the magnet 25 and to the distributor 2.

The foregoing relates to preferred exemplary embodiments of the invention, it being understood that other embodiments and variants thereof are possible within the spirit and scope of the invention, the latter being defined by the appended claims.

What is claimed and desired to be secured by Letters Patent of the United States is:

1. In a fuel injection pump for internal combustion engines including a distributor having a jacket face, a coupling, a pump drive shaft to drive said distributor through said coupling, said distributor having control grooves provided in said jacket face, and an injection quantity regulator means arranged to transmit axial displacement of said distributor to control fuel quantity, said coupling including distributor rotating means for rotating said distributor relative to said drive shaft, the improvement wherein said injection quantity regulator means includes an electric servomotor, and the distributor rotating means includes a rotary magnet having a core and a coil, connecting means connecting said core with the distributor, and said coil being carried on the drive shaft, said connecting means including a coupler element disposed between the core and the distributor, said coupler element comprising a cup having an axially extending wall, an end of the distributor being received in said cup and coupled thereto by a pin and slot connection permitting axial displacement of the distributor by said servomotor, an electronic control device connected to said electric servomotor and said distributor rotating means, said electronic control device including a computer to which engine characteristics are supplied as input, whereby said computer triggers said electric servomotor to effect said axial displacement of the distributor and said distributor rotating means to effect rotation of the distributor relative to said drive shaft.

2. In a fuel injection pump according to claim 1, the further improvement wherein said electric servomotor includes an electromagnet for which an axial extension of the distributor is the armature, the distributor being axially reciprocable by said servomotor.

3. A fuel injection pump according to claim 1, in which the control grooves are obliquely disposed relative to the longitudinal axis of the distributor.

* * * * *